Patented Aug. 13, 1946

2,405,894

UNITED STATES PATENT OFFICE 2,405,894

COMPOUNDS

Joy G. Lichty, Stow, Ohio, assignor to Wingfoot Corporation, Akron, Ohio, a corporation of Delaware No Drawing. Application June 6, 1942, Serial No. 446,055

2 Claims. (Cl. 260—487)

This invention relates to new trichloro propionates and the method of preparing them. The new compounds include the methyl, isobutyl and cyclohexyl trihalo propionates and, more particularly, the trichloro propionates.

According to this invention, the trihalo propionates are prepared by hydrolysis of the nitrile in an acid bath of the esterifying alcohol. Although the invention will be described more particularly as applied to the preparation of a trichloro propionate, it is to be understood that the other halo propionates may be similarly prepared.

Example 1

A mixture of 500 cc. isobutyl alcohol and 40 cc. of water was treated with 214 cc. of concentrated sulfuric acid to convert the alcohol to the acid sulfate. Three hundred and eighteen grams of $\alpha,\alpha,\beta$-trichloropropionitrile was added and the mixture heated on a steam bath to about 90° C. or above. After ¾ of an hour a vigorous reaction set in which required considerable cooling to keep it under control. Thereafter, the product was heated on the steam bath without any excessive exothermic reaction. The total reaction period was 20 hours. Water was added to dissolve the ammonium acid sulfate. An organic layer separated which was treated with aqueous sodium bicarbonate, dried and distilled. The resulting isobutyl trichloro propionate boiled at 121° C./32 mm. $D_{15}^{28}$ 1.233.

Isobutylene and triisobutylene were detected in the byproducts of the reaction.

When hydrochloric acid is used a smaller quantity of byproducts is produced.

Example 2

One hundred fifty eight and five-tenths grams of $\alpha,\alpha,\beta$-trichloropropionitrile, 111 grams isobutyl alcohol and 20 cc. of water were heated under a reflux condenser on a steam bath. An excess of hydrochloric acid gas was continually bubbled into this mixture. Colorless ammonium chloride started to separate in less than one-half hour.

At the end of a five-hour period the ammonium chloride was filtered off from the cooled product and washed well with isobutyl alcohol. The filtrate was distilled. It gave isobutyl trichloro propionate which boiled principally at 123° C./32 mm. A high yield was obtained. The product contained a small amount of trichloro propionic acid which can be removed by washing with bicarbonate.

Using hydrochloric acid as the acid reagent ammonium chloride of excellent quality is obtained as a by-product. The alcohol and trichloro propionitrile are low boiling and any excess which does not enter into the reaction can be recovered and returned to the process without any additional treatment. As a result, a practically quantitative yield may be obtained.

The best yields are obtained with the primary alcohols although secondary alcohols gave satisfactory results. The yield with tertiary alcohols is low.

The following example illustrates the preparation of the esters from trichloro propionamide. They may also be prepared from trichloro propionic acid and trichloro propionyl chloride. The preparation of trichloro propionamide is described and claimed in my copending application Serial No. 440,926, filed April 29, 1942.

Example 3

Eighty eight and three-tenths grams of trichloro propionamide, obtained by the addition of HCl to the nitrile followed by hydrolysis, dissolved in 55.5 grams of isobutyl alcohol was heated on a steam bath under a reflux condenser. Dry hydrochloric acid was bubbled into the solution. In ten minutes a solid separated which was identified as ammonium chloride. After three hours treatment the ammonium chloride was filtered off and washed with isobutyl alcohol. On distillation of the filtrate, a large fraction boiling at 121–123° C./32 mm. was obtained. The yield of the distilled ester was high.

The methyl ester of $\alpha,\alpha,\beta$-trichloro propionic acid may be formed by any of the above procedures substituting methyl alcohol for the isobutyl alcohol there used. The methyl ester has a boiling point of 102–4° C./55 mm. $D_{15}^{28}$ 1.446. Similarly, the cyclohexyl derivative may be prepared using cyclohexyl alcohol. The ester has a boiling point of 136–149° C./19 mm. Other esters which may be similarly prepared include the ethyl, propyl, butyl, amyl, tetrahydrofurfuryl, benzyl, octyl and 2-ethyl butyl esters.

The trichloro propionates may be used as plasticizers and intermediates in chemical syntheses.

I claim:

1. Cyclohexyl $\alpha,\alpha,\beta$-trihalo propionates.
2. Cyclohexyl $\alpha,\alpha,\beta$-trichloro propionate.

JOY G. LICHTY.